March 3, 1964 H. HECKHOFF 3,122,910
MACHINE FOR TREATING SKINS
Filed Nov. 15, 1961 3 Sheets-Sheet 1

March 3, 1964  H. HECKHOFF  3,122,910
MACHINE FOR TREATING SKINS
Filed Nov. 15, 1961  3 Sheets-Sheet 2

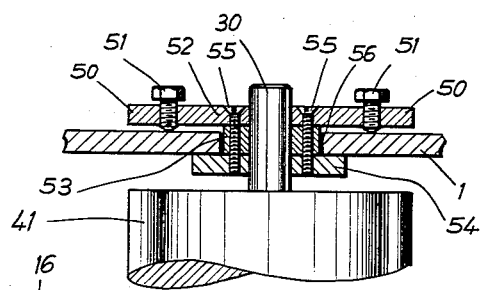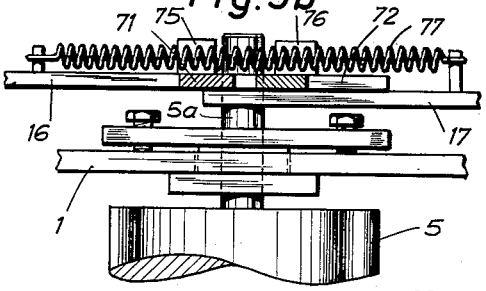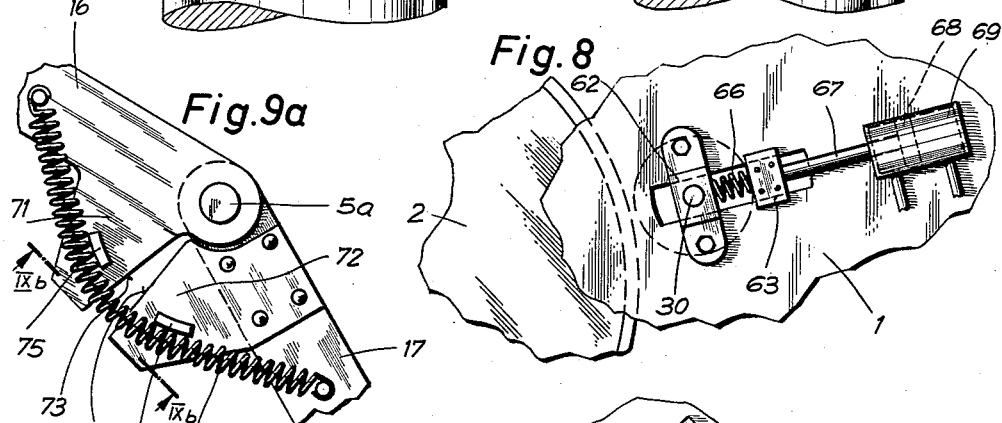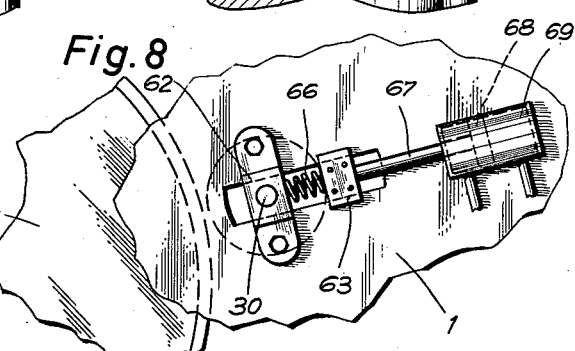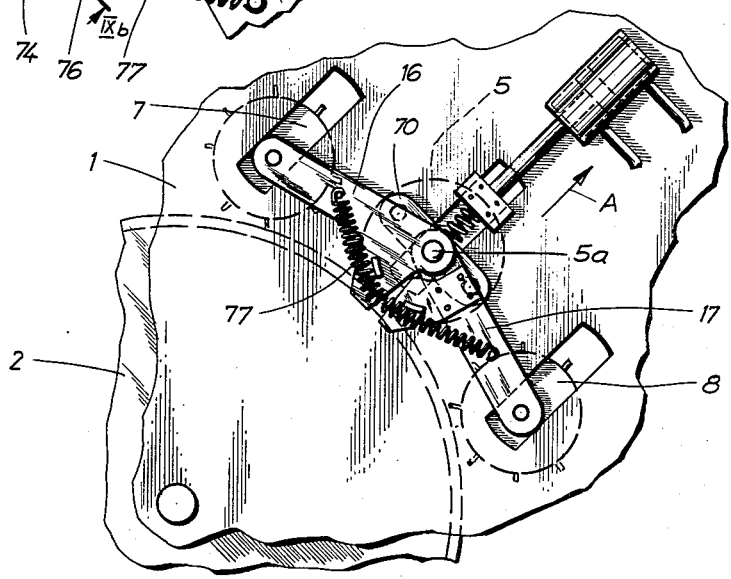

United States Patent Office 3,122,910
Patented Mar. 3, 1964

3,122,910
MACHINE FOR TREATING SKINS
Heinz Heckhoff, Wilhelmstrasse 13,
Mulheim (Ruhr), Germany
Filed Nov. 15, 1961, Ser. No. 152,413
Claims priority, application Germany Nov. 16, 1960
7 Claims. (Cl. 69—42)

The present invention relates to a machine for processing skins, as for instance the removal of flesh and hair, the stretching of skins and other steps in connection with the ordinary processing of skins, such as paring, scraping and sammying.

Drum-equipped machines for this purpose are known according to which the skin is clamped on a forwardly or rearwardly turning drum and is acted upon by a treating roller so that in one working operation half of the skin is processed.

Flesh removing machines for small skins are known comprising three rollers arranged relative to each other so as substantially to define a triangle.

According to a further known flesh removing machine with pneumatic skin placement, the skin to be processed is passed through a roller provided with knives and a pneumatic cushion. By varying the air pressure in the pneumatic cushion, the treatment by the oppositely located knife or cutter roller will be varied. After the skin has left the gap between the cutter roller and the pneumatic cushion, the skin is passed through oppositely located transporting rollers and grooved steel rollers.

It is an object of the present invention to provide a machine for treating skins, especially for removing flesh from skins, smoothing (streichen) the skins, or the like, which will make it possible to effect a continuous treatment of skins by simple means.

It is a further object of this invention to provide a machine as set forth in the preceding paragraph, which will make it possible precisely to adjust the processing rollers without complicated control devices.

It is still another object of this invention to provide a machine for processing skins which in spite of a high output will make it possible to treat the skins in a proper and highly efficient manner.

These and other objects and advantages of the invention will appear more clearly from the following specification in connection with the accompanying drawings, in which:

FIGURE 7 is a sectional view indicated by line VII—VII on FIGURE 6.

FIGURE 8 is a view of a modification showing how a processing roller can be adjusted by fluid pressure.

FIGURE 9 is a view showing an arrangement whereby the pressing roller and the processing rollers can be adjusted by a single fluid motor.

FIGURE 9a is a detail of the FIGURE 9 construction drawn on a somewhat enlarged scale, and FIGURE 9b is a view of the FIGURE 9 construction looking up from the bottom thereof.

Figure 1:
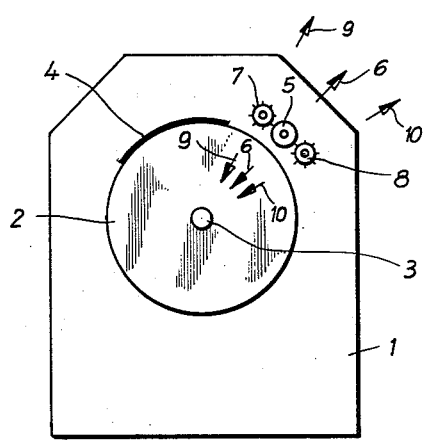
FIG. 1 represents a diagrammatic illustration of a machine according to the invention.

The invention is based on a machine for treating skins, for instance removing flesh from skins, scraping skins, or the like, which is equipped with a main roller supporting the skin to be processed and with one or a plurality of processing rollers. According to the present invention, a roller for pressing the skin against the main roller has associated therewith a processing roller which with regard to the direction of rotation of the main roller is arranged ahead or behind said main roller. For purposes of increasing the output, one processing roller each may, with regard to the direction of rotation of the main roller, be arranged ahead of or behind the pressing roller. These two treatment rollers are rotated in opposite direction with regard to each other. While the pressing roller is adjustable in conformity with the circumferential speed of the main roller, the processing rollers may rotate at different circumferential speeds. The circumferential speed of the processing rollers and their distance from the pressing roller and the main roller is preferably so selected that the pulling forces exerted upon the skin by the processing rollers will be substantially even. For particular purposes, the processing rollers may be adjusted to circumferential speeds respectively differing from each other.

For facilitating the introduction of the skin into the roller gap or roller bite between the main roller and the pressing roller on one hand or the main roller and processing roller on the other hand, the pressing and processing rollers are adjustable in radial or nearly radial direction of the main roller. This furnishes the possibility of placing the moist or wet skin upon the main roller and to bring the skin into the open roller gap or bite between the first processing roller and the main roller and between the pressing roller and main roller whereupon the two said rollers may be adjusted in radial direction toward the axis of the main roller. The second processing roller which when looking in the direction of rotation of the main roller is located behind the pressing roller may selectively be adjusted together with the first processing roller and the clamping or pressing roller or may be adjusted later than said processing roller and clamping or pressing roller.

According to a preferred embodiment of the invention, the processing roller or rollers art tiltable about the longitudinal axis of the clamping roller. With this arrangement these rollers are guided and held by tiltable fish plates or links engaging the two pivot ends and pivotable about the studs of the roller.

Referring now to the drawings in detail, the machine according to the present invention comprises two lateral frame members 1 having journalled therein the axle 3 of the main roller. This main roller 2 is so designed and arranged that a skin 4 may be placed upon the circumference of said roller in moist or wet condition.

The arrangement furthermore comprises a clamping roller 5 which is adjustable in radial direction with regard to the main roller 2 as indicated by the arrows 6. This furnishes the possibility to clamp the skin 4 between the circumference of the main roller 2 and a clamping roller 5, said two rollers preferably rotating at the same peripheral speed thereby determining the processing speed. When looking in the direction of rotation of the main roller 2, two processing rollers 7 and 8 are respectively arranged ahead and behind the clamping roller 5. These two processing rollers 7 and 8 are also adjustable in substantially radial direction with regard to the main roller 2 as indicated by the arrows 9 and 10. The processing rollers 7 and 8 may individually or together be arranged ahead of the vertical center line of said main roller when looking in the direction of rotation of said main roller.

Figure 2:
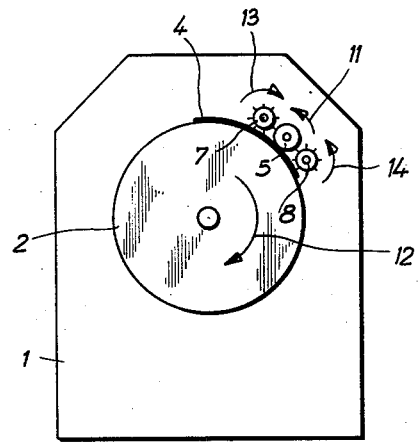
FIG. 2 is a diagrammatic illustration of a machine according to the present invention similar to that of FIG. 1 but with the treating rollers and pressing rollers in a different position.

FIG. 2 shows the clamping roller 5 and the processing rollers 7 and 8 in working position. The clamping roller as well as the processing rollers are with regard to the position shown in FIG. 1 adjusted in radial direction in such a way that the clamping roller 5 rotating in the direction of the arrow 11 clamps the skin 4 against the main roller 2 which latter rotates in the direction of the arrow 12. The processing roller 7 rotates in the direction of the arrow 13 so that the processing tools engaging the skin will have the tendency to move the skin away from the clamping roller 5. The processing roller 8 rotating in the direction of the arrow 14 strokes by means of its processing tools the skin in the direction of the arrow 12 of the main roller 2 and thus in a direction opposite to the tools of the processing roller 7. The pulling forces exerted upon skin 4 by the processing tools of rollers 7 and 8 may be so selected that the oppositely effective pulling forces of said two rollers 7 and 8 are substantially even. For particular purposes, also one processing roller may run at a higher speed than the other processing roller while the clamping roller will prevent the skin from slipping on the main roller.

Figure 3:
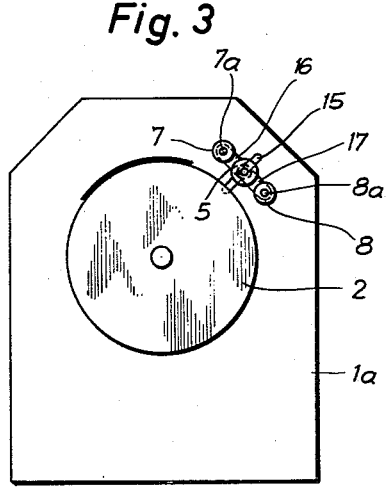
FIG. 3 shows the arrangement and guiding system for the treating or processing rollers.
Figure 4:
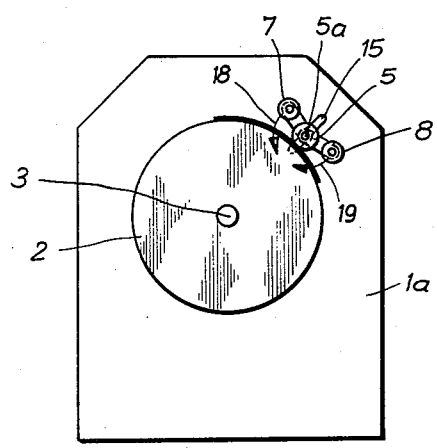
FIG. 4 shows the same arrangement as FIG. 3, however, with the pressing roller occupying its clamping position.
Figure 5:
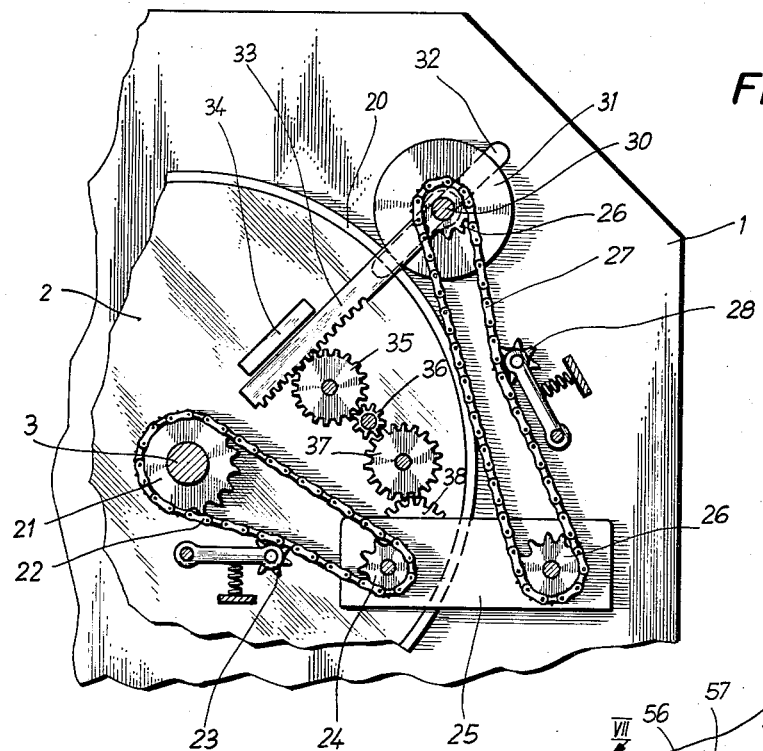
FIGURE 5 is a fragmentary elevational view showing an arrangement for driving the main roller and the pressing roller and for adjusting the pressing rollers.

Referring now to FIGS. 3 and 4, these figures show a preferred arrangement of the clamping roller 5 and the processing rollers 7 and 8. As will be seen from FIGS. 3 and 4, fish plates or links 16, 17 are tiltably mounted on the pivot necks 5a of the clamping roller 5 which latter is guided in an oblong opening 15 provided in the two lateral frame members 1a of the machine. The free ends of the fish plates 16, 17 support the axle studs 7a, 8a of the processing rollers 7, 8 respectively. The studs 7a, 8a are pressed against the circumference of the main roller 2 in any convenient manner, for instance by springs.

FIG. 4 illustrates the adjustment of the clamping roller in the oblong openings 15, the clamping roller pressing the skin against the surface of the main roller 2. The processing rollers are in conformity with the showing of FIG. 4 out of engagement with the skin and are tiltable in the direction of the arrows 18, 19 about the axle studs 5a. The processing rollers may be driven in any standard manner, for instance by chains or gears. In front of the processing rollers there may be arranged fold smoothening tools or rollers as they are known in this particular art.

FIGS. 5 through 9b show further details of the machine, the side walls of the machine on which the roller shafts are supported either directly or indirectly being in most cases removed for better visibility of the details. Those side walls also carry some of the adjusting means used for the rollers. Only in FIGS. 5 and 7 one of the side walls indicated by reference numeral 1 is shown. In these figures, axle 3 carrying the main roller 2 is shown to be supported on the side walls 1 of the machine. Roller 2 is in a known manner provided with a rubber coating 20 on which the skin is placed.

Mounted on axle 3 there is a sprocket wheel 21 operatively connected with a sprocket wheel 24 of an infinitely variable transmission 25 by means of a chain 22 biased by a resiliently supported tension pulley 23. The driving sprocket wheel 26 of the infinitely variable transmission of known design is operatively connected by a chain 27 biased by a sprocket wheel equipped tension pulley 28 with a sprocket wheel 26' mounted on the shaft 30 of the pressing roller 31. This pressing roller is mounted in a slot 32 so as to be shiftable towards the axle 3. The extent of this parallel displacement depends on the type of the skin, on the pressure applied by the pressing roller to be described hereinafter, and the thickness of the rubber coating 20. In order to synchronize the peripheral speeds of rollers 2 and 31, a rack 33 slidably engaging rail 34 mounted on the side wall of the machine and receiving a gear 35 is arranged to be shiftable together with shaft 30 towards the axle 3. Upon movement of the rack 33 in its longitudinal direction, gears 35, 36, 37 are rotated and the adjustment gear 38 of the infinitely variable transmission 25 is rotated to cause the rotational speed of sprocket wheel 26 to correspond to the displacement 30 in the slots 32.

Figure 6:
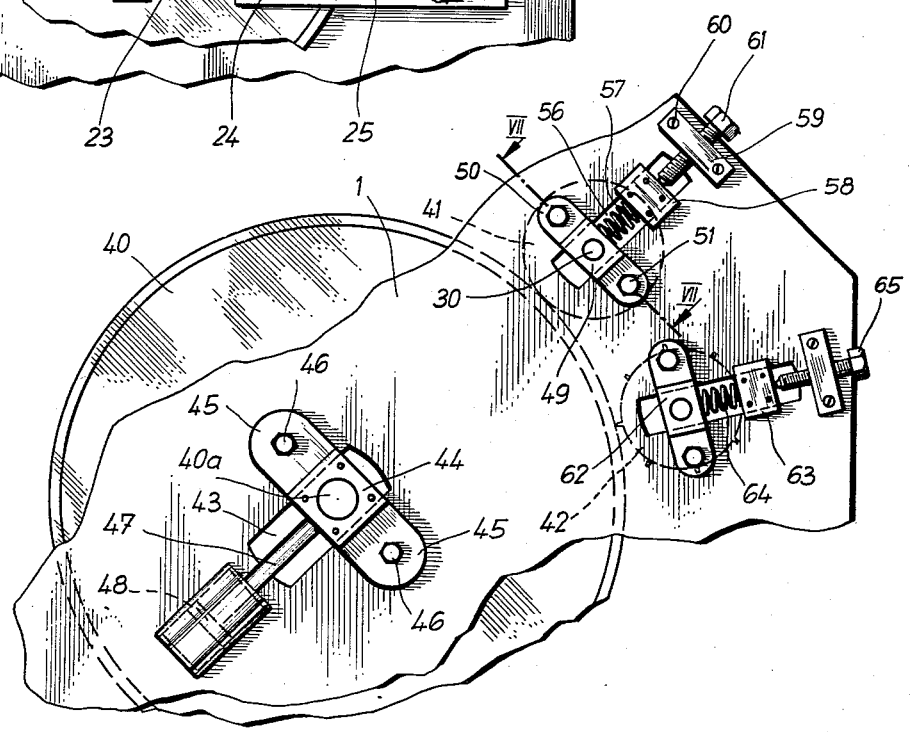
FIGURE 6 is a side view of a modification showing how the main roller can be adjusted in place of the pressing roller on the processing rollers.

FIG. 6 illustrates the possibility of adjusting the main roller 40 in relation to the pressing roller 41 and one of the processing rollers 42. The second processing roller which is arranged in a similar manner as the processing roller 42 is not shown in the drawing. Both of the side walls 1 of the machine are provided with elongated apertures 43 adapted to receive sliding blocks 44. On the side visible to the viewer, the sliding blocks are fitted with ears 45 being slid along the side walls. Ears 45 are provided with adjusting screws 46 the points of which are adapted to abut against the side wall when the screws are tightened. Similar sliding blocks provided with ears are associated with the shafts of rollers 41 and 42 and will be described in detail with reference to FIG. 7. The sliding block 44 is engaged by the piston rod 47 of piston 48 which is exposed to a pressurized medium. After the adjusting screws 46 have been released, the piston is moved to urge the roller 40 and its shaft 40a to the desired position whereupon the adjusting screws 46 are tightened to fix shaft 40a in its position.

Similar sliding blocks 49 with ears 50 and adjusting screws 51 are attached to the shaft 30 of pressing rollers 41, 42 (FIG. 6). The sliding blocks are preferably composed of three plate-like portions 52, 53, 54 (FIG. 7) secured to one another by countersunk screws 55, the centrally disposed plate 53 having approximately the same width as the slot 56. The plate 52 is fitted with ears 50 receiving the adjusting screws 51 in tap holes provided therein. Upon tightening of the screws 51 the sliding block is clamped against the respective wall 1 of the machine whereby also the respective shaft is held in its position.

When the screws 51 are released, the sliding block is exposed to the influence of a spring 57 engaging a second sliding block 58 which is not fitted with the laterally arranged ears. A block 59 is secured by means of screws 60 to each of the side walls, each block being fitted with an adjusting screw 61 the point of which abuts the sliding block 58. By adjusting the screw 61, the pressure of the pressing roller can be varied after the adjusting screws 51 have been released. A similar arrangement of sliding blocks 62, 63, spring 64 and adjusting screw 65 may be made for the processing rollers.

Another arrangement in connection with a processing roller is shown in FIG. 8. A similar adjusting arrangement may also be provided for the other processing roller as well as for the pressing roller. Again the shaft 30 is supported by the sliding block 62, a spring 66 being inserted between block 62 and a second sliding block 63, the ends of the spring being tightly secured to the sliding blocks. The sliding block is engaged by a piston rod 67 and the respective piston 68 is slidably received in a cylinder 69 for reciprocating movement.

FIGS. 9, 9a and 9b show details of the devices illustrated in FIGS. 3 and 4. The processing rollers 7, 8 are connected to shaft 5a of the roller 5 by the fish plates or links 16, 17. Shaft 5a is supported by a block 70 of similar design as the sliding blocks 49 and 62 shown in FIGS. 6 and 7. The remaining details concerning displacing and adjusting means for roller 5 conform to those illustrated in FIG. 8.

The two links 16, 17 are provided with ears 71, 72 aligned in one common plane, for which purpose the ear 72 is secured to the link 17 by screws or rivets. The two ears are fitted with edges 73, 74 facing one another so that their relative swinging movement is limited thereby. Both ears 71, 72 carry guide bars 75 and 76, respectively, engaging a spring 77 the ends of which are attached to the links 16 and 17, and which urges the processing rollers 7, 8 toward the main roller 2. If desired, the tension of spring 77 may be arranged by known means to be variable. When the shaft 5a is moved in the direction indicated by the arrow A, the processing rollers will first remain in the position shown in the drawing. Upon further retraction of the shaft 5a from the roller 2, the two edges will move toward each other until they abut one another whereafter, upon continued advance of shaft 5a, the two processing rollers 7, 8 will be lifted from the skin or the roller 2 respectively.

It is, of course, to be understood that the present invention is, by no means, limited to the particular constructions shown in the drawings but also comprises any modifications within the scope of the appended claims. The machine according to the invention can also be applied for hides.

What I claim is:

1. A machine for processing skins, especially removing flesh therefrom and scraping, paring and sammying skins, which includes: a rotatable main roller having a structural length in excess of the length of a plurality of average cattle skins, two rotatable processing rollers rotatable in opposite direction to each other, said processing rollers being arranged in spaced relationship to each other near the periphery of said main roller and being adjustable relative thereto, a rotatable pressing roller arranged between said processing rollers near the periphery of said drum, said processing and pressing rollers being arranged within a 90° sector behind the vertical central plane of said drum when looking in the direction of rotation of said drum, and means operatively interconnecting said pressing roller and said processing rollers for moving the same together selectively toward and away from said drum.

2. A machine for processing skins, especially removing flesh therefrom and scraping, paring and sammying skins, which includes: a rotatable main roller having a structural length in excess of the length of a plurality of average cattle skins, two rotatable processing rollers rotatable in opposite direction to each other, said processing rollers being arranged in spaced relationship to each other near the periphery of said main roller and being adjustable relative thereto, a rotatable pressing roller arranged between said processing rollers near the periphery of said drum, said processing and pressing rollers being arranged within a 90° sector behind the vertical central plane of said drum when looking in the direction of rotation of said drum, link means operatively connecting said processing rollers with said pressing roller, means operatively connected to said link means for actuating the same to thereby adjust said processing rollers and said pressing roller in common relative to said drum, said link means being provided with abutment surfaces operable to engage each other in response to a certain movement of said pressing roller away from said drum.

3. A machine according to claim 2, which includes: spring means for continuously urging said abutment surfaces toward each other.

4. A machine according to claim 1, which includes means for adjusting the pressing roller to rotate at substantially the same circumferential speed as that of said main roller.

5. A machine according to claim 1 in which drive means including an adjustable transmission is disposed between and drivingly interconnects said main roller and said pressing roller, said transmission including a member movable for adjusting the speed of the transmission, and means connecting said member with said pressing roller for adjustment of the transmission in response to movement of the pressing roller radially of the main roller thereby to maintain the peripheral speed of the pressing roller substantially equal to the circumferential speed of a skin carried by the main roller and against which the pressing-roller bears.

6. A machine for processing skins, especially removing flesh therefrom and scraping, paring and sammying skins, which includes: a rotatable main roller having a circumferential length in excess of the length of a plurality of average cattle skins, two rotatable processing rollers rotatable in opposite directions to each other, said processing rollers being arranged in spaced relationship to each other near the periphery of said main roller, a rotatable pressing roller arranged between said processing rollers near the periphery of said main roller, said processing and pressing rollers being arranged within a 90° sector behind the vertical central plane of said main roller when looking in the direction of rotation of said main roller, and means for adjusting said rollers relatively along a line passing substantially through the center of said main roller and said pressing roller.

7. A machine for processing skins, especially removing flesh therefrom and scraping, paring and sammying skins, which includes: a rotatable main roller having a circumferential length in excess of the length of a plurality of average cattle skins, two rotatable processing rollers rotatable in opposite directions to each other, said processing rollers being arranged in spaced relationship to each other near the periphery of said main roller, a rotatable pressing roller arranged between said processing rollers near the periphery of said main roller, said processing and pressing rollers being arranged within a 90° sector behind the vertical central plane of said main roller when looking in the direction of rotation of said main roller, and means for adjusting said rollers relatively along a line passing substantially through the center of said main roller and said pressing roller, said pressing roller and said processing rollers being resiliently biased in the radial direction toward said main roller.

References Cited in the file of this patent

UNITED STATES PATENTS

| | | |
|---|---|---|
| 592,952 | Evans | Nov. 2, 1897 |
| 1,860,713 | Jones | May 31, 1932 |
| 2,666,317 | Griffin | Jan. 19, 1954 |
| 2,669,112 | Griffin | Feb. 16, 1954 |